Oct. 22, 1968  N. R. BORCH  3,406,713
SAFETY FLOW CONTROLLER FOR A HYDRAULIC LINE
Filed June 9, 1966
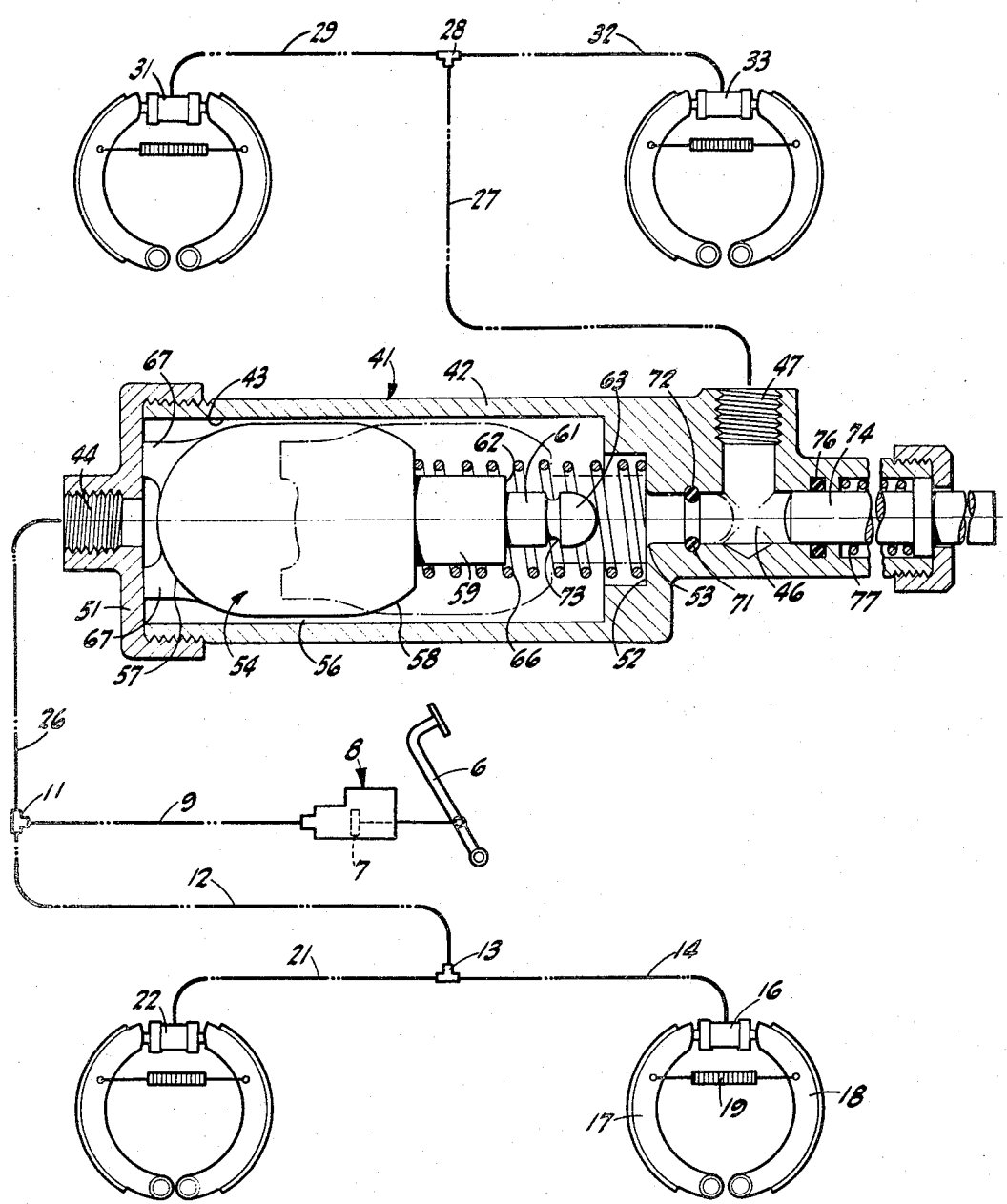
INVENTOR.
NIELS R. BORCH
BY
Lothrop & West
ATTORNEYS

United States Patent Office 3,406,713
Patented Oct. 22, 1968

3,406,713
SAFETY FLOW CONTROLLER FOR A HYDRAULIC LINE
Niels R. Borch, Livermore, Calif., assignor to The Regents of the University of California, Berkeley, Calif.
Filed June 9, 1966, Ser. No. 556,336
1 Claim. (Cl. 137—498)

ABSTRACT OF THE DISCLOSURE

A valve for use in a hydraulic brake system that upon rupture of the line blocks flow therefrom to preserve the operability of the remaining lines. Through the use of a compressed O-ring the valve is maintained in a closed condition until repair of the ruptured line is accomplished.

---

My invention relates to means useful in any hydraulic flow line but particularly adapted for use in the flow lines of automotive hydraulic brakes for preserving the operability of at least some of the system should there be a failure in another portion thereof.

In many instances in which flow occurs in a hydraulic conduit, the entire system is drained or at least loses pressure where there is a rupture or break in some portion of the system. This usually leads to complete failure of the device being operated by the hydraulic liquid or results in a complete disruption of the intended function.

In most present automotive brake systems the fluid under pressure from the master cylinder is distributed through branched lines to individual ones of a number of brake actuators. Should there be a failure in any branch line, the entire system becomes inoperative almost immediately.

It is therefore an object of my invention to provide means for use in connection with a hydraulic system, either for general flow or in the automotive environment, which blocks off the failed part of the system so that the remaining, proper portion of the system can continue to give at least its usual response or effect.

Another object of the invention is to provide a safety flow controller for a hydraulic line of simple, straightforward and cheap fabrication.

Another object of the invention is to provide a safety flow controller for a hydraulic line which remains substantially constant in its operation despite variations in many of the operating conditions.

Another object of the invention is to provide a safety flow controller for a hydraulic line which is virtually unresponsive to any except the selected pressure drop for which the system is designed.

Another object of the invention is in general to improve safety flow controllers for hydraulic lines.

Other objects together with the foregoing are attained in the embodiment of the invention described in the accompanying description and illustrated in the accompanying drawing, in which:

The figure is a diagrammatic representation, portions being in cross section on a longitudinal plane, showing a typical automotive brake line layout with the safety flow controller of the invention included therewith.

While the structure can be incorporated in a number of different environments, including flow lines and particularly including hydraulic systems in which breakage is likely to occur in some one of several branches, it has with success been fabricated as shown herein for inclusion in a typical four-wheel hydraulic brake automotive system. In this arrangement the brake pedal 6 on the vehicle actuates a piston 7 reciprocable in a master cylinder 8 that is connected by a pipe 9 to a T 11. A conduit 12 branches from the T 11; for example, rearwardly, and itself is connected to a T 13 having a branch pipe 14. This is joined to a double piston cylinder mechanism 16 of the usual kind arranged when supplied with liquid under pressure to spread a pair of arcuate brake shoes 17 and 18. The shoes are pivoted and operate against a return spring 19. In the other branch pipe 21 from the T 13 an entirely similar arrangement is provided in connection with the left rear hydraulic cylinder 22. The T 11 symmetrically has a similar conduit 26 which leads to a continuing conduit 27. This joins to a T 28 having branches 29 extending to a spring-returned hydraulic brake cylinder 31 and leads to a conduit 32 leading to a similar spring-returned hydraulic brake cylinder 33. It should be understood that the four brake devices 16, 22, 31 and 33 are all substantially identical, being expanded upon receipt of fluid under pressure and being spring returned in order to return the fluid to the master chamber 8.

Pursuant to the invention and to preclude entire disruption of the system should one of the mechanisms downstream of the conduit 27 fail, I provide for insertion between the conduits 26 and 27, or in any other portion of the hydraulic circuit the downstream part of which is to be protected, a safety flow controller 41. This is a housing 42 usually fabricated of metal and has a generally circular cylinder 43 formed therein. Coaxially disposed at one end of the cylinder is an inlet passage 44 joined to the conduit 26. At the other end is an outlet passage 46 a portion of which is coaxial and another portion 47 of which forms an outlet passage joined to the conductor 27.

The inlet passage 44 merges smoothly with the interior of the cylinder 43 by way of an end wall 51. At the other end the cylinder 43 terminates in an end wall 52 merging through a lightly rounded corner 53 with the outlet passage 46. The internal diameter of the cylinder 43 is a predetermined value which is constant from one end to the other thereof.

Designed to reciprocate within the cylinder and disposed within the housing 42 is a body 54 preferably comprised of an extremely light plastic material unaffected by the hydraulic fluid and having a diameter substantially less than the diameter of the cylinder 43. This leaves an intervening annular passageway 56 of substantial size. The body 54 is streamlined by curved surfaces 57 and 58 which merge with an enlarged neck 59. A reduced diameter stem 61 projects axially from the neck 59 to leave an intervening shoulder 62. The stem is substantially of the same diameter as the axial portion of the passage 46.

The length of the stem 61 is just about sufficient to enter well into the axial outlet passage 46 with the shoulder 62 then in substantial abutment with the end wall 52. The end 63 of the stem is preferably smooth or rounded so that it can readily enter the axial passage 46 even though the axis of the cylinder 43 and the actual axis of the body 54 may be slightly displaced or cocked with respect to each other. Interposed between the end wall 52 of the housing and an appropriate portion of the body 54 is a return helical spring 66 having sufficient length and strength normally to urge the body against the wall 51. Since the end of the body might otherwise overlie and block the inlet passage 44, the body 54 is provided with a number of feet 67 or extensions designed to hold the body just off of the wall 51.

In the operation of this much of the structure, when the brake is not applied and all of the springs 19 are contracted, the parts are quiescent with the spring 66 holding the body 54 against the end wall 51. When the brake pedal 6 is depressed and the fluid is pumped out of the master cylinder 8 into the various lines, some of the flow takes place through the cylinder 43. This flow is around the body 54 through the annulus 56 between the body and the cylinder. The flowing fluid is effective generally to hold the body out of physical contact with the cylinder so that body motion is virtually frictionless. Preferably the light, plastic body is insufficiently heavy to lower by gravity through the annular film of hydraulic fluid beneath it into physical contact with the bottom cylinder wall.

Since the annular passage 56 is somewhat restricted, the inflow of hydraulic fluid to one end of the body is greater than can pass through the annulus in a brief time. This results in a pressure drop or differential across the body 54 between the inlet passage 44 and the outlet passage 46. The pressure differential is sufficient to cause the body 54 to move to the right in the figure against the urgency of the spring 66. Under all normal conditions of proper operation, the body 54 moves to the right only a fractional amount so that the end of the stem 61 does not closely approach the outlet passageway 46 and a normal brake application occurs.

When the pedal 6 is released, the various springs 19 cause the fluid to be expelled from the cylinders such as 16, 22, 31 and 33. Some of that fluid in turn flows in a reverse direction from the outlet passage 46 partly around the body 54 and through the inlet 44 to the master chamber. Since the passageway 56 is equally restricted in this direction of flow, there is a pressure drop across the body 54 which is translated to the left by the pressure drop with the help and urgency of the spring 66. The body is finally stopped with the feet 67 against the wall 51.

Under unusual circumstances; for example, when there is a break in the conduit and the pedal 6 is depressed, the body 54 is translated to the right as before except that because of the rupture the pressure drop across the body is substantially greater, there is no restriction on downstream flow and the force on the body translates the stem 61 to enter into, substantially occupy and virtually close the outlet passage 46 so that further hydraulic fluid flow cannot occur. The pressure is transmitted as before to the actuating cylinders 16 and 22 so that at least part of the system remains operative.

It is preferred in a situation of this kind not to permit the body 54 to return to its former location when the pedal 6 is released. Rather, it is preferred to hold the piston in its blocking position. For that reason, there is an O-ring 71 situated in a groove 72 surrounding the outlet passageway 46 and engageable by the walls of a groove 73 formed in the stem 61. Alternatively, the O-ring 71 can be on the stem with appropriate grooving in the housing. When the body 54 is displaced far enough for the stem to bring the groove 73 substantially into registry with the O-ring 71, the previously compressed O-ring then expands quickly into the groove 73 and holds the parts locked in that location.

The arrangement may be such that an entirely new unit must be substituted for a unit that has gotten into the described "locked" position or there may be provided a manually operable plunger 74 extending axially from the housing through an O-ring 76 acting as a seal. By depression of the actuator 74 the stem 61 can be displaced from the outlet passageway and started back toward its normal position, which it eventually attains under the urgency of the spring 66. The actuator can be manually restored to inoperative position or can be so urged by a spring 77.

With this mechanism, therefore, I have provided a device which is responsive to hydraulic flow and can be utilized in any hydraulic flow system to block flow to ruptured lines or otherwise to control or regulate the flow. In the particular instance described, the unit is effective to block off or plug a ruptured automobile hydraulic brake line in a fashion to leave the sound brake lines still in functioning condition. The device, once having been actuated, can be restored to its initial position for further use. The device can be installed in any of the indicated lines and will operate repeatedly with reproduceable results even after long periods of disuse. This is largely because there is a relatively loose streamlined fit between the body and the housing so that a layer or annulus of liquid surrounds the body and the friction of the bodily movement is thus friction within the hydraulic fluid and does not come from the rubbing of plastic or metal parts on each other.

What is claimed is:

1. A safety flow controller for a hydraulic line comprising a housing adapted to be inserted in said line and defining a cylinder of a predetermined diameter and having an inlet passage adjacent one end and an outlet passage adjacent the other end, a body disposed within said cylinder and having a diameter substantially less than said predetermined diameter to leave a substantial annular passageway between said body and said cylinder, a stem on said body adapted in one position of said body substantially to occupy and block said outlet passage, an interfitting O-ring and means defining a groove disposed on said stem and in said outlet passage, and a spring interposed between said housing and said body in position to urge said body away from said outlet passage.

References Cited
UNITED STATES PATENTS

| | | | |
|---|---|---|---|
| 2,551,045 | 5/1951 | Parker | 137—113 |
| 2,566,609 | 9/1951 | Grosse | 137—118 |
| 2,750,956 | 6/1956 | Stevenson | 137—460 |
| 2,879,791 | 3/1959 | Hollmann | 137—460 |
| 3,085,589 | 4/1963 | Sands | 137—498 |

ALAN COHAN, *Primary Examiner.*

HAROLD W. WEAKLEY, *Assistant Examiner.*